(12) United States Patent
Federici

(10) Patent No.: US 9,005,691 B2
(45) Date of Patent: *Apr. 14, 2015

(54) METHOD FOR PRODUCING A CONFECTIONERY SEMI-PROCESSED PRODUCT, SUCH AS A CHOCOLATE-TYPE PRODUCT

(75) Inventor: Fabio Federici, Arlon (BE)

(73) Assignee: Soremartec S.A., Arlon (BE)

(*) Notice: Subject to any disclaimer, the term of this patent is extended or adjusted under 35 U.S.C. 154(b) by 0 days.

This patent is subject to a terminal disclaimer.

(21) Appl. No.: 13/638,281

(22) PCT Filed: Mar. 30, 2011

(86) PCT No.: PCT/IB2011/000681
§ 371 (c)(1),
(2), (4) Date: Nov. 19, 2012

(87) PCT Pub. No.: WO2011/121429
PCT Pub. Date: Oct. 6, 2011

(65) Prior Publication Data
US 2013/0059054 A1    Mar. 7, 2013

(30) Foreign Application Priority Data

Mar. 30, 2010 (IT) .............................. TO2010A0252

(51) Int. Cl.
*A23G 1/14* (2006.01)
*A23G 1/56* (2006.01)
(Continued)

(52) U.S. Cl.
CPC ................ *A23G 1/56* (2013.01); *A23G 3/0215* (2013.01); *A23G 3/001* (2013.01); *A23G 1/042* (2013.01); *A23G 1/0026* (2013.01); *A23G 1/12* (2013.01)

(58) Field of Classification Search
CPC ....... A23G 1/0026; A23G 1/042; A23G 1/10; A23G 3/001; A23G 3/0215
USPC .............. 426/631, 660, 518, 519; 366/79–90; 241/24.26, 154

See application file for complete search history.

(56) References Cited

U.S. PATENT DOCUMENTS 1,621,409 A * 3/1927 Horn .............................. 241/154
2,669,924 A * 2/1954 Wiemer .......................... 99/486
(Continued)

FOREIGN PATENT DOCUMENTS

CN          1267239 A    9/2000
CN     101069868 A    11/2007
(Continued)

*Primary Examiner* — Drew Becker
(74) *Attorney, Agent, or Firm* — Dickstein Shapiro LLP

(57) ABSTRACT

A method of producing a semifinished confectionary product, such as chocolate or similar, using at least one centrifugal unit for simultaneously grinding and mixing at least some of the ingredients of the semifinished product, and which includes an elongated processing chamber with a substantially horizontal axis, at least one inlet for the ingredients to be processed and one outlet for the processed ingredients, and a powered shaft fitted inside the processing chamber, coaxially with the axis, and fitted with a succession of radial appendixes arranged between the inlet and the outlet; the method including the steps of loading at least a first ingredient of the semifinished product through the inlet; grinding the first ingredient inside the grinding and mixing unit by rotating the shaft at a first speed; loading at least a second ingredient through the inlet, after grinding; rotating the shaft at a second speed to grind and mix the ingredients to form a mixture of the same grain size as the semifinished product; loading at least a third ingredient through the inlet; mixing the third ingredient with the previously ground mixture to form a further mixture; bringing the further mixture to a given temperature to obtain the semifinished product; and transferring the semifinished product to a storage or packaging station.

15 Claims, 2 Drawing Sheets

(51) Int. Cl.
*A23G 3/02* (2006.01)
*A23G 3/34* (2006.01)
*A23G 1/04* (2006.01)
*A23G 1/00* (2006.01)
*A23G 1/12* (2006.01)

(56) References Cited

U.S. PATENT DOCUMENTS

| | | | |
|---|---|---|---|
| 2,673,802 A * | 3/1954 | Hansen | 426/519 |
| 2,711,964 A * | 6/1955 | Wiemer | 99/494 |
| 2,713,474 A * | 7/1955 | Read | 241/65 |
| 3,432,109 A * | 3/1969 | Geissel | 241/172 |
| 4,042,721 A * | 8/1977 | Ziccarelli | 426/613 |
| 4,224,354 A * | 9/1980 | Szegvari | 426/584 |
| 4,389,427 A * | 6/1983 | Schmitt et al. | 426/631 |
| 4,440,797 A * | 4/1984 | Berkes et al. | 426/613 |
| 4,713,256 A * | 12/1987 | Chaveron et al. | 426/631 |
| 4,861,615 A | 8/1989 | Wiedmann | |
| 5,156,878 A * | 10/1992 | Tadema | 426/631 |
| 5,450,786 A * | 9/1995 | Muntener | 99/485 |
| 5,505,542 A * | 4/1996 | Braeker et al. | 366/299 |
| 5,554,409 A * | 9/1996 | Vezzani | 426/631 |
| 5,707,145 A * | 1/1998 | Lucke et al. | 366/279 |
| 6,129,008 A * | 10/2000 | Muntener | 99/348 |
| 6,238,724 B1 * | 5/2001 | Carvallo et al. | 426/631 |
| 6,375,101 B1 | 4/2002 | Kelsey | |
| 2007/0202241 A1 * | 8/2007 | Abaurre | 426/660 |

FOREIGN PATENT DOCUMENTS

| | | |
|---|---|---|
| CN | 101125306 A | 2/2008 |
| DE | 33 31 445 A1 | 5/1984 |
| EP | 0 518 025 A2 | 12/1992 |
| EP | 0 565 887 A1 | 10/1993 |

* cited by examiner

METHOD FOR PRODUCING A CONFECTIONERY SEMI-PROCESSED PRODUCT, SUCH AS A CHOCOLATE-TYPE PRODUCT

TECHNICAL FIELD

The present invention relates to a method of producing a semifinished confectionary product, such as chocolate or similar.

More specifically, the present invention may be used to advantage for producing semifinished products containing no or only a small percentage (less than 5%) of cocoa paste, and in which the cocoa flavour is achieved using cocoa powder.

BACKGROUND ART

In practice, semifinished products containing substantially no cocoa paste do not need particularly thorough conging, unlike other mixtures in which conging is normally essential to reduce the viscosity of the mixture, and especially to eliminate some of the volatile components of the cocoa paste and initiate chemical reactions to enhance the flavour of the semifinished product.

The conventional method currently used is discontinuous, and comprises loading the basic ingredients inside mixers consisting of tanks fitted inside with agitators. After a first mixing stage, the entire mixture is transferred to known cylinder-type pre-refining machines, and then to known, conveniently also cylinder-type, refining machines, which gradually reduce the mixture to the desired grain size, normally of less than 30 microns. The ground mixture is then transferred to conging machines known as conges, and, when the mixture in the conges reaches a given consistency, the other ingredients are added to make up the dosage, and the mixture is pumped into storage facilities, pending further processing. An example of such a system employing conging tanks is described, for example, in US Patent Application US 2007/0202241.

Though used for decades, the above method has various drawbacks. In particular, the refining process is discontinuous and slow, and involves bulky, high-cost machinery.

The conges normally used to process the semifinished product are also bulky and expensive, and the processing cycles are normally lengthy, to achieve a fluid enough product for further processing.

Conventional methods also pose problems when making production changeovers, which is a painstaking job, especially to clean the machinery.

DISCLOSURE OF INVENTION

It is an object of the present invention to provide a method of producing a semifinished confectionary product, such as chocolate or similar, designed to provide a simple, low-cost solution to the above drawbacks, and which in particular produces semifinished confectionary products with the same characteristics as known products, but much faster and with no need for conging units or devices.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
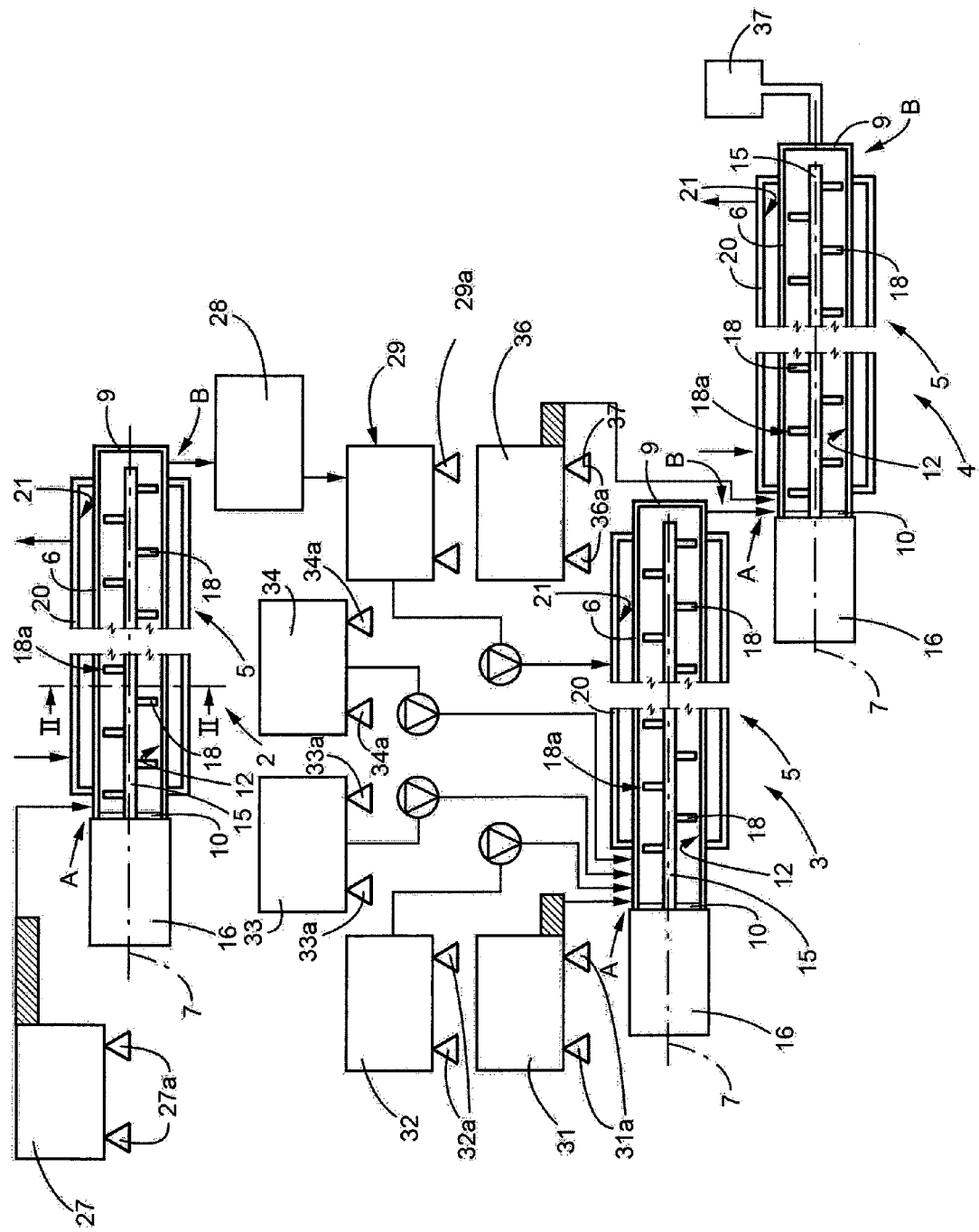
FIG. 1 shows a schematic, substantially block diagram of a preferred embodiment of a system for producing a semifinished confectionary product in accordance with the teachings of the present invention.

Number 1 in FIG. 1 indicates as a whole a system for producing a semifinished confectionary product such as chocolate or similar and comprising, for example, sugar, powdered milk, vegetable fat, and cocoa powder, to which the following description refers, both in terms of ingredients and production conditions, purely by way of example.

System 1 comprises a first and second centrifugal grinding and mixing unit 2, 3 separate from each other; and a centrifugal mixing unit 4 separate from units 2 and 3. Units 2, 3, 4 are cascaded or arranged in series to continuously supply a semifinished confectionary product of a given grain size, and which conveniently contains at most 10% of over 30-micron size grains, and has a viscosity of roughly 4000 pascals/second.

Each unit 2, 3, 4 comprises a substantially horizontal outer casing 5, in turn comprising a tubular, preferably cylindrical, shell 6 extending coaxially with a respective axis 7 and closed at opposite ends by two end walls 9, 10. Tubular shell 6 and end walls 9, 10 together define an elongated processing chamber 12, which communicates with the outside through an inlet A (shown schematically) for loading the ingredients for processing, and an outlet B (shown schematically) for unloading the processed ingredients.

Figure 2:
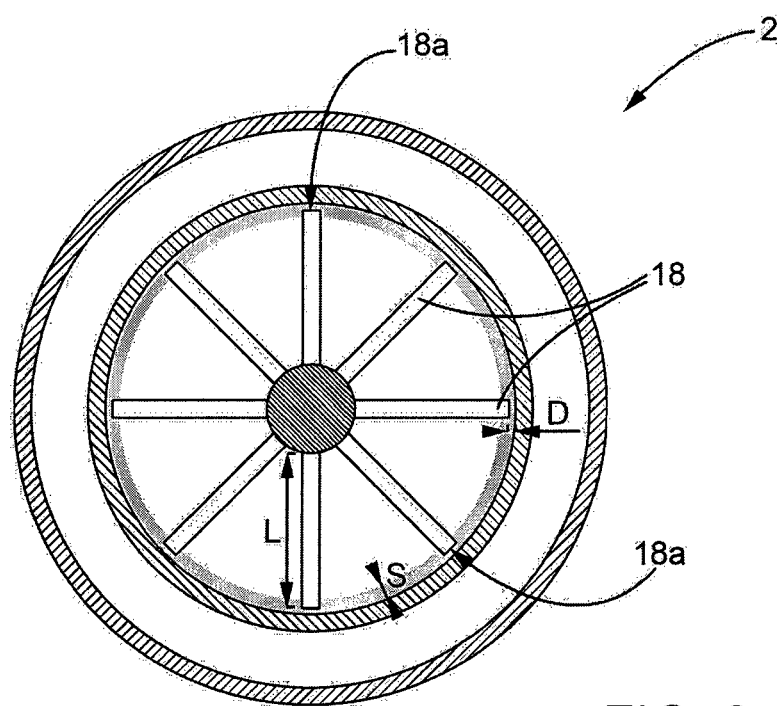
FIG. 2 shows a larger-scale section along line II-II in FIG. 1.

A shaft 15, rotated by a motor reducer 16, extends, coaxially with axis 7, through end wall 10, and is fitted integrally with one or more coiled rows of radial appendixes 18. Each radial appendix 18 has a stem connected releasably to shaft 15, and is of such a length L (FIG. 2) that its free-end surface 18a is separated by a distance D of 0.2 to 4 millimetres, and conveniently of 2 millimetres, from the inner surface 6a of shell 6 (FIG. 2).

Casing 5 also comprises an annular portion 20, which encloses shell 6 and defines with it an annular chamber 21 communicating externally through an inlet and an outlet for a temperature-controlled fluid for conditioning shell 6.

As shown in FIG. 1, system 1 also comprises a known metering device 27 mounted on load cells 27a to feed inlet A of unit 2 with precise measures or a continuous supply of granulated sugar with a conveniently 2000-3000 micron grain size.

As shown in FIG. 1, outlet B of unit 2 communicates with a storage container 28, in turn connected to a known metering device 29 mounted on load cells 29a to feed inlet A of unit 3 with precise measures or a continuous supply of ground sugar containing at most 10% of 30-70-micron size grains. As shown in FIG. 1, system 1 also comprises another four metering devices 31, 32, 33, 34 mounted on respective load cells 31a, 32a, 33a, 34a to respectively feed inlet A of unit 3 with precise measures or continuous supplies of powdered milk of 50-100 micron grain size, vegetable oils, cocoa powder of 100-200 micron grain size, and technological additives such as soybean lecithin.

Unit 4, which, unlike units 2 and 3, is simply a mixing unit, is supplied by unit 3 with a mixture of the same grain size as the semifinished product, and is connected to a further metering device 36 mounted on load cells 36a to feed inlet A of unit 4 with fluidifying vegetable fat. As shown in FIG. 1, processing chamber 12 of unit 4 is connected to a vacuum unit 37 for maintaining −0.1 to −0.5 bar negative pressure in chamber 12.

The semifinished confectionary product is produced as follows. Metering device 27 feeds granulated sugar into unit 2 through respective inlet A, and respective shaft 15 is then rotated at a speed ranging between 200 and 10,000 rpm, and conveniently of 5000 rpm, for a time ranging between 0.5 and 5 minutes, and conveniently for 4 minutes. As the shaft rotates, the centrifugal force produced by appendixes 18, and the small distance D between the ends of appendixes 18 and the inner surface 6a of shell 6, grind the sugar to a grain size containing at most 10% of 30- to 70-micron size grains. As the sugar is ground, the centrifugal force also spins it onto inner surface 6a of shell 6, where it forms a layer of a thickness S (FIG. 2) ranging between 0.2 and 4 millimetres. During the grinding process, shell 6 is maintained at a temperature of −80 to +15° C. by feeding a conditioning fluid, e.g. liquid nitrogen, through respective chamber 21.

The ground sugar is fed to storage container 28, and from there to metering device 29, which feeds it to inlet A of unit 3. Metering devices 31-34 also supply inlet A of unit 3, either simultaneously or successively, with given amounts of powdered sugar, vegetable oils, cocoa powder, and technological additives, following which, shaft 15 of unit 3 is rotated at a speed of 500 to 2000 rpm for 0.5 to 5 minutes, and at any rate long enough to obtain homogeneous mixture of the same grain size as the semifinished product. As the mixture is ground, the corresponding processing chamber is maintained at a temperature of +10 to +50° C. by feeding conditioning fluid through respective chamber 21.

The mixture is then transferred to and mixed further in unit 4, to which metering device 36 adds a given amount of vegetable fat. Shaft 15 of unit 4 is rotated at a speed of 500 to 2000 rpm for 0.5 to 5, and preferably for 4, minutes, and at any rate long enough to obtain a perfectly homogenous mixture of substantially the same viscosity as the semifinished product. After the vegetable fat is added, the processing chamber of unit 4 is maintained at a temperature of 40 to 60° C., by feeding conditioning fluid through respective chamber 21, and at a pressure of −0.1 to −0.5 bar.

Once mixing is completed, the semifinished product in unit 4 is transferred to a storage container.

As will be clear from the above description, the semifinished product described is prepared using the 'continuous grinding' method, i.e. grinding some of the ingredients, in this case sugar, before mixing it with the other ingredients, and then grinding it again together with the other ingredients to obtain a perfectly homogenous mixture, already with the same grain size as the semifinished product to be prepared.

The described preparation method provides above all for producing semifinished confectionary products with no need for conventional conging, grinding, and mixing devices, which complicate the system and increase system cost and production time. At the same time, the described method provides for producing perfectly homogeneous semifinished confectionary products of given constant grain size from course ingredients, in particular sugar, that are therefore readily available and easy to manage. In fact, the material being processed is spun onto, and forms a thin layer on, the lateral walls of the processing chamber; and the difference in speed between the layer of material on the rotating radial appendixes of the relative shaft and the layer of material on the inner wall of the processing chamber produces relative movement, and therefore thorough mixing and grinding, of the material.

Semifinished confectionary products can thus be produced fast using a system which, being 'modular', is extremely simple in design, easy to control, and, above all, compact. Units 2, 3 and 4, in fact, all form part of the same class, and range between 150 and 500 mm in diameter, and 200 and 2000 mm in length.

The significant reduction, as compared with conventional methods, of the number of parts coming into contact with the product drastically reduces washing operations between batches and simplifies the washing when making production changeovers. Thanks to this feature, the same system, as opposed to dedicated lines, can be used for producing different semifinished products.

Clearly, changes may be made to system 1 and the method described without, however, departing from the protective scope as defined in the accompanying Claims. As regards the method, the ingredients may obviously differ from those referred to by way of example.

As for the system, this may, obviously, even comprise only one centrifugal unit, similar or identical to one of units 2-4, which first grinds one of the ingredients, e.g. the granulated sugar, and is then loaded with the other ingredients, either all together or one at a time, grinding the mixture further each time. Once mixing is completed, the vegetable oil is added, again in the same centrifugal unit. This is a highly compact, low-cost solution which, compared with the one described above, provides for further reducing production changeover cleaning time.

The invention claimed is:

1. A method of producing a semifinished confectionary product having a grain size, comprising:
   providing a first centrifugal unit having a tubular shell closed at opposite ends by two walls for defining an elongated processing chamber housing a motorized shaft fitted integrally with one or more coiled rows of radial appendices;
   providing a second centrifugal unit having a tubular shell closed at opposite ends by two walls for defining an elongated processing chamber housing a motorized shaft fitted integrally with one or more coiled rows of radial appendices;
   providing a third centrifugal unit having a tubular shell closed at opposite ends by two walls for defining an elongated processing chamber housing a motorized shaft fitted integrally with one or more coiled rows of radial appendices;
   grinding sugar within the first centrifugal unit from a first grain size to a second grain size, the second grain size being smaller than the first grain size, the second grain size being larger than the grain size of said semifinished confectionary product, and outputting ground sugar from said first centrifugal unit;
   mixing said ground sugar with at least one second ingredient inside said processing chamber of said second centrifugal unit by rotating said shaft of said second centrifugal unit inside said chamber of said second centrifugal unit to move said ground sugar and said at least one second ingredient inside said chamber of said second centrifugal unit along at least one straight, horizontal, simultaneous grinding and mixing path, and to simultaneously grind and mix the ground sugar and the at least one second ingredient to form a mixture of the same grain size as the grain size of said semifinished confectionary product;
   taking said mixture out of said chamber of said second centrifugal unit through an outlet of said processing chamber of said second centrifugal unit, wherein said step of simultaneous grinding and mixing includes spinning the whole of said ground sugar and of said at least one second ingredient onto lateral walls of said processing chamber of said second centrifugal unit to form a layer of a predetermined thickness thereon; a difference in speed between said layer on said lateral walls and said radial appendices of said second centrifugal unit producing relative movement, and therefore thorough mixing and grinding; and inputting said mixture into the third centrifugal unit.

2. A method as claimed in claim 1, wherein said mixing step is carried out by rotating said shaft of the second centrifugal unit at a speed of 200 to 10,000 rpm for 0.5 to 5 minutes.

3. A method as claimed in claim 2, wherein said mixing step is carried out by rotating said shaft of the second centrifugal unit at a speed of 500 to 2,000 rpm for 0.5 to 5 minutes.

4. A method as claimed in claim 1, wherein said processing chamber of the second centrifugal unit is identical to the processing chamber of said first centrifugal unit.

5. A method as claimed in claim 4, further comprising the step of feeding the ground sugar to a storage device before moving it towards said second centrifugal unit for grinding and mixing.

6. A method as claimed in claim 1, further comprising the step of adding at least a third ingredient to said mixture; mixing said third ingredient to said mixture to form a further mixture; and bringing said further mixture to a given temperature and viscosity to obtain said semifinished confectionary product.

7. A method as claimed in claim 1, wherein said processing chamber of the first centrifugal unit is maintained at a temperature between −80° C. and +15° C.

8. A method as claimed in claim 1, wherein said processing chamber of the second centrifugal unit is maintained at a temperature between +10° C. and +50° C.

9. A method as claimed in claim 6, wherein said processing chamber of the third centrifugal unit is maintained at a temperature between 40° C. and 60° C.

10. A method as claimed in claim 6, wherein, after adding said third ingredient, said processing chamber of the third centrifugal unit is maintained at a negative pressure.

11. A method as claimed in claim 10, wherein, after adding said third ingredient, the pressure of said processing chamber of the third centrifugal unit is reduced to −0.1 to −0.5 bar.

12. A method of producing a semifinished confectionary product having a grain size, comprising:

providing a first centrifugal unit having a tubular shell closed at opposite ends by two walls for defining an elongated processing chamber housing a motorized shaft fitted integrally with one or more coiled rows of radial appendices;

providing a second centrifugal unit having a tubular shell closed at opposite ends by two walls for defining an elongated processing chamber housing a motorized shaft fitted integrally with one or more coiled rows of radial appendices;

providing a third centrifugal unit having a tubular shell closed at opposite ends by two walls for defining an elongated processing chamber housing a motorized shaft fitted integrally with one or more coiled rows of radial appendices;

grinding sugar within the first centrifugal unit from a first grain size to a second grain size, the second grain size being smaller than the first grain size, the second grain size being larger than the grain size of said semifinished confectionary product, and outputting ground sugar from said first centrifugal unit;

mixing said ground sugar with at least one second ingredient inside said processing chamber of said second centrifugal unit by rotating said shaft of said second centrifugal unit inside said chamber of said second centrifugal unit to move said ground sugar and said at least one second ingredient inside said chamber of said second centrifugal unit along at least one straight, horizontal, simultaneous grinding and mixing path, and to simultaneously grind and mix the ground sugar and the at least one second ingredient to form a mixture of the same grain size as the grain size of said semifinished confectionary product, wherein said step of simultaneous grinding and mixing is carried out by rotating said shaft of said second centrifugal unit at a speed of 200 to 10,000 rpm for 0.5 to 5 minutes, whereby the whole of said ground sugar and of said at least one second ingredient are spun onto, and form a layer on, lateral walls of said processing chamber of said second centrifugal unit; a difference in speed between said layer and said radial appendices of the second centrifugal unit producing relative movement, and therefore thorough mixing and grinding; and inputting said mixture into the third centrifugal unit.

13. A method as claimed in claim 12, wherein said layer has a thickness ranging between 0.2 to 4 millimeters.

14. A method as claimed in claim 12, wherein the shaft of the first centrifugal unit rotates at a speed of 200 to 10,000 rpm for 0.5 to 5 minutes.

15. A method as claimed in claim 12, wherein said semifinished confectionary product contains at most 10% of over 30-micron size grains, and has a viscosity of roughly 4000 Pascal-seconds.

* * * * *